Figure 1:
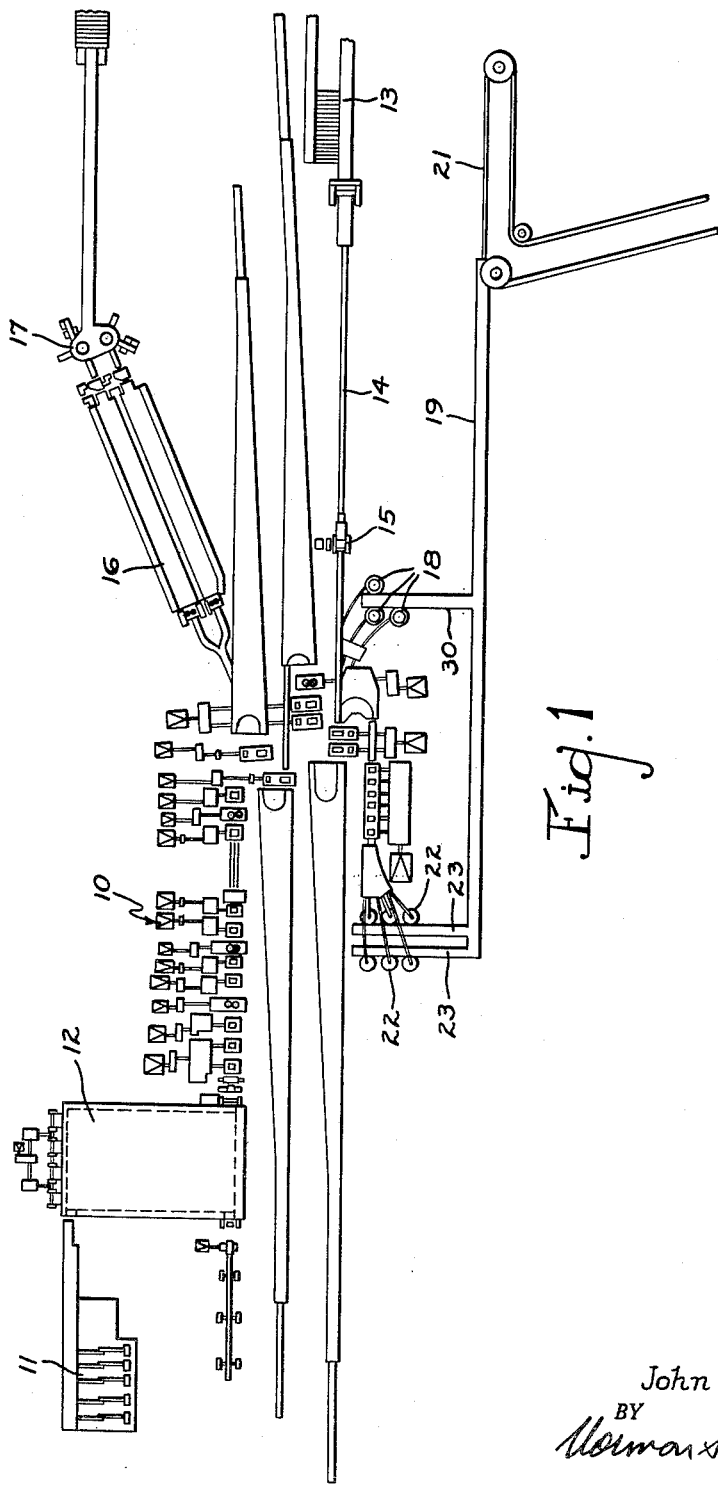

Dec. 4, 1962   J. H. HITCHCOCK   3,066,558
ROLLING MILL
Original Filed May 11, 1956   6 Sheets-Sheet 2

INVENTOR.
John H. Hitchcock
BY
Norman S. Blodgett
Attorney

Dec. 4, 1962  J. H. HITCHCOCK  3,066,558
ROLLING MILL
Original Filed May 11, 1956  6 Sheets-Sheet 3

INVENTOR.
John H. Hitchcock
BY Norman S. Blodgett
Attorney

Dec. 4, 1962 J. H. HITCHCOCK 3,066,558
ROLLING MILL
Original Filed May 11, 1956 6 Sheets-Sheet 4
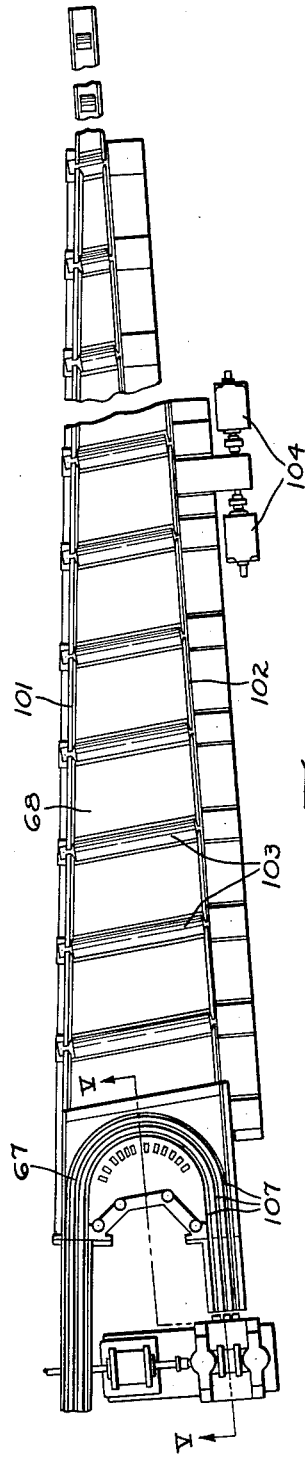
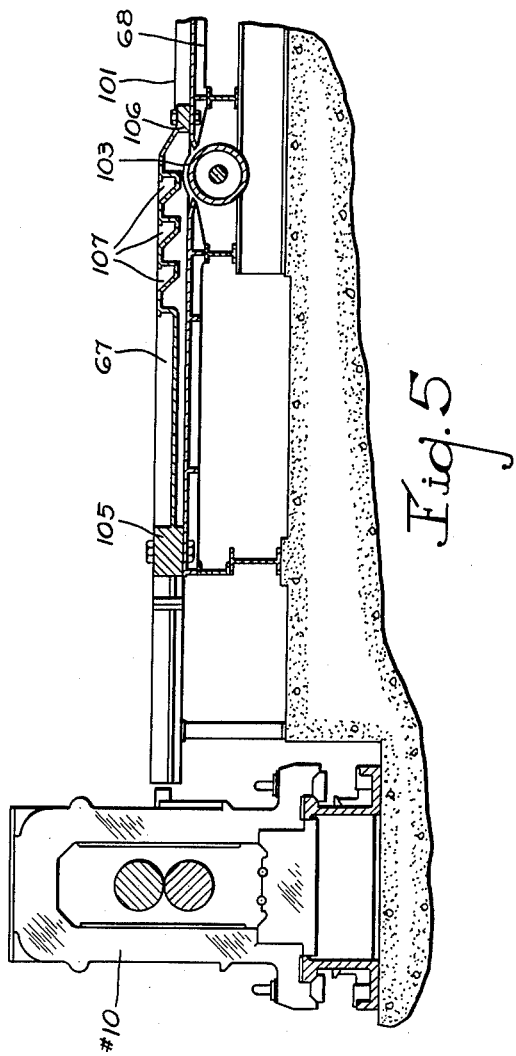
INVENTOR.
John H. Hitchcock
BY
Norman J. Blodgett
Attorney Dec. 4, 1962  J. H. HITCHCOCK  3,066,558
ROLLING MILL
Original Filed May 11, 1956  6 Sheets-Sheet 5

Fig. 6

INVENTOR.
John H. Hitchcock
BY
Attorney

Dec. 4, 1962  J. H. HITCHCOCK  3,066,558
ROLLING MILL

Original Filed May 11, 1956  6 Sheets—Sheet 6

"B" LINE
3½" SQUARE BILLET

| STAND No. | | | | | | | | | | | | | | | | | |
|---|---|---|---|---|---|---|---|---|---|---|---|---|---|---|---|---|---|
| 1 | ⬭ | ⬭ | ⬭ | ⬭ | ⬭ | ⬭ | ⬭ | ⬭ | ⬭ | ⬭ | ⬭ | ⬭ | ⬭ | ⬭ | ⬭ | ⬭ | ⬭ |
| 2 | ○ | ○ | ○ | ○ | ○ | ○ | ○ | ○ | ○ | ○ | ○ | ○ | ○ | ○ | ○ | ○ | ○ |
| 3 | ◇ | ◇ | ◇ | ◇ | ◇ | ◇ | ◇ | ◇ | ◇ | ◇ | ◇ | ◇ | ◇ | ◇ | ◇ | ◇ | ◇ |
| 4 | ○ | ○ | ○ | ○ | ○ | ○ | ○ | ○ | ○ | ○ | ○ | ○ | ○ | ○ | ○ | ○ | ○ |
| 5 | ◇ | ◇ | ◇ | ◇ | ◇ | ◇ | ◇ | ◇ | ◇ | ◇ | ◇ | ◇ | ◇ | D | D | D | D |
| 6 | ○ | ○ | ○ | ○ | ○ | ○ | ○ | ○ | ○ | ○ | ○ | ○ | ○ | D | D | D | D |
| 7 | ◇ | ◇ | ◇ | ◇ | ◇ | ◇ | ◇ | ○ | ○ | ○ | ○ | ○ | ○ | ○ | D | D | D |
| 8 | ○ | ○ | ○ | ○ | ○ | ○ | ○ | ○ | ○ | ○ | ○ | ○ | ○ | ○ | ○ | ○ | ○ |
| 9 | ◇ | ◇ | ◇ | ◇ | ◇ | ◇ | ◇ | ◇ | ◇ | ◇ | ◇ | ◇ | ◇ | ◇ | ◇ | ◇ | ◇ |
| 10 | ○ | ○ | ○ | ○ | ○ | ○ | ○ | ○ | ○ | ○ | ○ | ○ | ○ | ○ | ○ | ○ | ○ |
| 11 | ◇ | ◇ | ◇ | ◇ | ◇ | ◇ | ◇ | ◇ | ◇ | ◇ | ◇ | ◇ | ◇ | ◇ | ◇ | ◇ | ◇ |
| 12 | ○ | ○ | ○ | ○ | ○ | ○ | ○ | ○ | ○ | ○ | D | D | D | D | D | D | D |
| 13 | D | D | D | D | D | D | D | D | D | D | ○ | ○ | ○ | ○ | ○ | ○ | ○ |
| 14 | ○ | ○ | ○ | ○ | ○ | ○ | ○ | ○ | ○ | ○ | D | D | D | D | D | D | D |
| 15 | D | D | D | D | D | D | D | D | D | D | ○ | ○ | ○ | ○ | ○ | ○ | ○ |
| | | | | | | | | | | | 1.3 | 1.5 | 1.6 | 1.7 | 2.1 | 2.4 | 2.8 | 3.1 |
| SIZE OF ROD OR ROUND | 11"/64 | 3"/4 | 13"/16 | 7"/8 | 15"/16 | 1" | 1 1"/16 | 1 1"/8 | 1 3"/16 | 1 1"/4 | 1 5"/16 | 1 3"/8 | 1 7"/16 | 1 1"/2 | 1 5"/8 | 1 3"/4 | 1 7"/8 | 2" |
| FEET/MINUTE— | 2000 | | 1512 | | 1134 | | 884 | | 708 | | 579 | | 500 | | 500 | | 500 | |
| DELIVERY SPEED | 1775 | | 1302 | | 1000 | | 788 | | 638 | | 528 | | 500 | | 500 | | 500 | |

*Fig. 7*

INVENTOR.
John H. Hitchcock
BY Norman S. Blodgett
Attorney

United States Patent Office 3,066,558
Patented Dec. 4, 1962

3,066,558
ROLLING MILL
John H. Hitchcock, Worcester, Mass., assignor to Morgan Construction Company, Worcester, Mass., a corporation of Massachusetts
Continuation of abandoned application Ser. No. 584,279, May 11, 1956. This application Feb. 17, 1960, Ser. No. 9,393
1 Claim. (Cl. 80—31.1)

This application is a continuation of copending application Serial No. 584,279, filed May 11, 1956, now abandoned.

This invention relates to a rolling mill and more particularly to apparatus for attenuating elongated lengths of metal by the rolling process.

It is customary in steel mill practice to employ single purpose continuous rolling mills in plants having sufficient steel making capacity and market demand to utilize the entire potential capacity of such a single purpose mill. In plants having too little steel making capacity or too little market demand to justify use of a single purpose mill, it has been customary to install rolling mills having multiple functions. For example, the larger steel producers employ one or more rolling mills devoted exclusively to the production of wire rods, and one or more other mills devoted exclusively to the production of small merchant bars, and still other mills designed respectively for the exclusive production of large merchant bars and structural shapes. In contrast to this, smaller steel producers whose aggregate steel making capacity and market demand can utilize the entire productive capacity of a continuous rolling mill must distribute this total capacity among a wide variety of products differing in both size and shape. Multipurpose mills, designed to meet requirements of this kind, are well-known in steel mill practice. For example, it is not unusual to combine in one continuous rolling mill the ability to produce wire rod and small merchant bars, and in some cases outlets for strip or skelp are also incorporated.

The multipurpose continuous rolling mills which are now known to the steel making art are stringently limited as to the range of product size which they can handle effectively and, in some instances, are so arranged that they present during operation a constant hazard to the safety of certain operators. This last statement refers particularly to "back loops" in which operators are surrounded by repeaters or hand-looped bars of moving hot steel. In addition, the present merchant mills which employ the same finishing stand and leader stand (immediately preceding the finishing stand) for all products necessarily have roll diameters in these stands which are a compromise between the requirements for the smallest and largest products and are therefore not well suited to the requirements except in the middle of the size range. Furthermore, the present mills of this kind require extended interruption of production whenever it is necessary to change from one range of product size to another. These and other deficiencies of the prior art constructions have been obviated by the present invention in a novel manner.

It is therefore an outstanding object of the present invention to provide a continuous rolling mill capable of producing a much wider range of products than has been possible heretofore.

Another object of the invention is the provision of a continuous rolling mill capable of producing a wide range of products with a minimum of time-consuming changes in the apparatus necessitated by a change of product from one extreme size or type to another.

A still further object of this instant invention is the provision of a continuous rolling mill which will produce wire rods, small merchant bar, large merchant bar or structural shapes without compromise of the optimum conditions for each product.

It is another object of this invention to provide a continuous rolling mill arrangement which is extremely flexible and which may be changed quickly from the production of one class or size of product to another.

An additional object of the invention is to provide a continuous multipurpose rolling mill in which the safety hazard of "back loops" is eliminated.

With these and other objects in view, as will be apparent to those skilled in the art, the invention resides in the combination of parts set forth in the specification and covered by the claims appended hereto.

Figure 2:
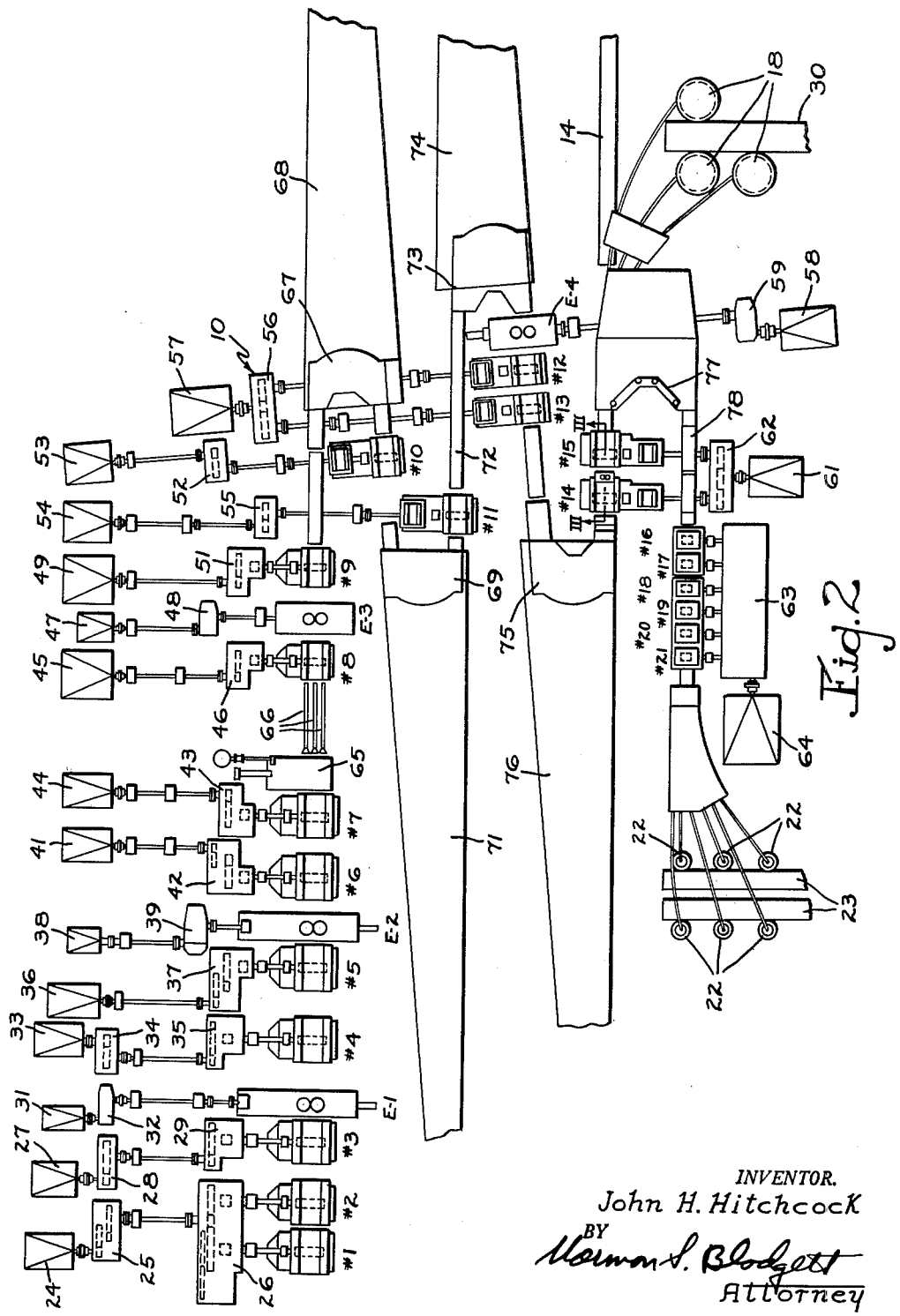
Figure 3:
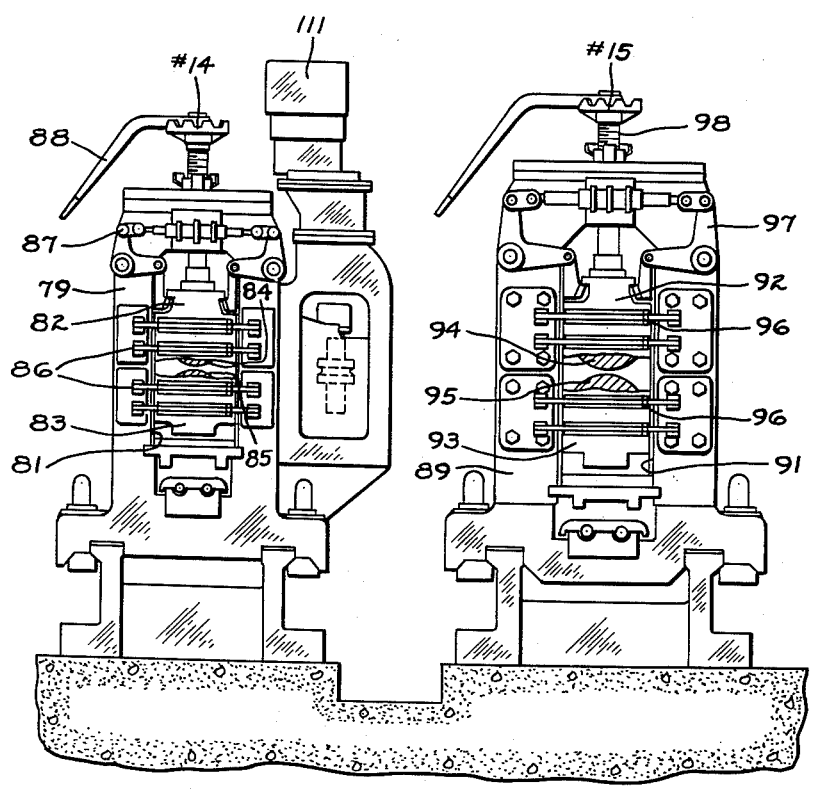

The character of the invention, however, may be best understood by reference to certain of its structural forms as illustrated by the accompanying drawings in which:

FIGURE 1 is a plan view of a multipurpose continuous rolling mill embodying the principles of the present invention, FIGURE 2 is an enlarged view of a portion of the apparatus shown in FIGURE 1, FIGURE 3 is a view of the apparatus taken on the line III—III of FIGURE 2, FIGURE 4 is a plan view of part of the apparatus shown in FIGURES 1 and 2, FIGURE 5 is a sectional view of the apparatus taken on the line V—V of FIGURE 4, and FIGURES 6 and 7 are charts showing the roll pass arrangement used in the mill.

Referring first to FIGURE 1 wherein is best shown the general features of the invention, the rolling mill, designated generally by the reference numeral 10, is shown in use with the usual steel mill apparatus. The mill 10 is preceded by a billet unscrambler 11 and a reheating furnace 12 provided with the conventional auxiliary equipment. Following the mill 10 is a cooling bed 13 served by a hot runout table 14 and a flying shear 15. The mill is also provided with strip handling apparatus 16 and coilers 17. Also following the mill are pouring reels 18 for coiled merchant bars, which reels are arranged to move finished coils over an intermediate conveyor 30 to a main chain conveyor 19 leading to a hook carrier 21. The mill 10 is also provided with laying reels 22 for wire rods, which reels are adapted to expel finished coils onto reel conveyors 23 leading to the main conveyor 19.

In FIGURE 2 is shown the general layout and arrangement of the mill. Horizontal roll stands are arranged with the axes of their rolls extending generally transversely of the mill and, for purposes of identification, these are designated as stands #1 through #21. Vertical roll stands, designed primarily for edging, are designated as E-1, E-2, E-3 and E-4. Stands #1 and #2 are driven by a single motor 24 through a gear unit 25 and a compact drive 26 containing gears and mill pinions. Horizontal stand #3 is driven by a motor 27 through a gear unit 28 and a compact drive 29. Vertical stand E1 is driven by a motor 31 through a gear unit 32. A motor 33 drives the horizontal stand #4 through a gear unit 34 and a compact drive 35. A motor 36 is used to drive the horizontal stand #5 through a compact drive 37. The vertical stand E2 is driven by a motor 38 through a gear unit 39. Horizontal stand #6 is driven by a motor 41 through a compact drive 42, while horizontal stand #7 is driven through a compact drive 43 by a motor 44. A motor 45 drives the horizontal stand #8 through a compact drive 46, a motor 47 drives the vertical stand E3 through a compact drive 48, and a motor 49 drives the horizontal stand #9 through a compact drive 51. Horizontal stand #10 is driven through a gear unit 52 by a motor 53. Horizontal stand #11 is driven by a motor 54 operating through a gear unit 55. Horizontal stands #12 and #13 are driven through a gear unit 56 by a single motor 57. A motor 58 operates through a gear unit 59 to drive the vertical stand E4. Horizontal stands #14 and #15 are driven by a single motor 61 through gear unit 62. The horizontal stands #16, #17, #18, #19, #20 and #21 are driven through a common compact drive 63 by a single motor 64. Horizontal stands #1 through #9 as well as vertical stands E1, E2 and E3, are arranged along a common center line. As is evident in the drawing, vertical stand E1 lies between horizontal stands #3 and #4, vertical stand E2 lies between horizontal stands #5 and #6, and vertical stand E3 is situated between horizontal stands #8 and #9. Following horizontal stand #7 is a crop and cobble shear 65 and a set of guide pipes 66 for use in multiple-strand rolling. The center line of stand #10 is inclined slightly to and spaced laterally from the center line of the preceding stands and a 180° repeater 67 is situated between stands #9 and #10; a skew Y reversing table 68 is also mounted between these stands. The center line of horizontal stand #11 is parallel to and spaced from the center line of stands #1 through #9, and a 180° repeater 69 is located between stands #10 and stand #11, as well as a skew Y reversing table 71. Following stand #11 is an elongated guide trough 72 passing over the drive spindles of stands #12 and 13; this guide terminates in a 180° repeater 73. The outlet end of the repeater is aligned with the center line of the vertical roll stand E4, which center line is spaced from and inclined slightly to the center line of roll stand #11. Between stand #11 and vertical stand E4 is also situated a skew Y reversing table 74. Following the stand E4 and aligned therewith are the horizontal stands #12 and #13. The stands #14 and #15 have a common center line which is spaced from the center line of stands #12 and #13, but is parallel to the center line of the stands #1 through #9. Between stand #13 and stand #14 is situated a 180° repeater 75 as well as a skew Y reversing table 76. Following the horizontal stand #15 is a 180° repeater 77; also, the runout table 14 and the pipes leading to the pouring reels 18 are aligned to receive product on occasion from either of the horizontal stands #14 or #15. The drive shaft for the vertical roll stand E4 passes under the table 77 from the motor 58 and the gear unit 59. A guide trough 78 passes over the drive shafts of horizontal stands #14 and #15 and serves to connect the repeater 77 to the horizontal stand #16. The horizontal stands #16, #17, #18, #19, #20 and #21 are aligned in closely-spaced relationship, their alignment being parallel to stands #1 to #9. Stand #21 is arranged to discharge wire rod into the laying reels 22 through delivery pipes.

FIGURE 3 shows a transverse elevation of stands #14 and #15 showing some of the details of construction of these stands. Horizontal stand #14 is what would be considered a small stand, whereas horizontal stand #15 is relatively large. Stand #14 is provided with a housing 79 having windows 81 in which are mounted upper roll chocks 82 and lower roll chocks 83. Small rolls 84 and 85 are mounted in the chocks 82 and 83 respectively. The stand is provided with parallelogram roll adjusting mechanism 86 and hydraulic roll-lifting apparatus 87, as well as the usual screw down 88. The exit side of stand #14 is provided with an apparatus 111 having small, precision, vertical rolls; this apparatus is shown and described completely in the patent of O'Malley No. 2,105,258. Horizontal roll stand #15 comprises a housing 89 having windows 91 in which are mounted upper roll chocks 92 and lower roll chocks 93 in which, in turn, are mounted large rolls 94 and 95. Parallelogram roll adjusting mechanism 96 is provided as well as hydraulic roll-lifting apparatus 97 and a screw down 98. Stands #12 and #13 are constructed in a manner similar to stands #14 and #15, respectively, in that stand #12 is of small size and is provided with small rolls, while stand #13 is of large size and has large rolls. Stands #12 and #13 are not provided with precision apparatus similar to that mounted on stand #14. Stand #15 likewise can be equipped with the precision vertical roll apparatus 111 if desired. The diameters of the small rolls in stands #12 and #14 and the large rolls in stands #13 and #15 obviously must be selected in accordance with the required range of product size. The rolls in stands #12 and #14 must be small enough to deal effectively and accurately with the smallest product finished in #14 stand, whereas the rolls in stands #13 and #15 must be large enough to handle the largest product required. In the mill described here, stands #12 and #14 are provided with rolls having 11" nominal diameter, while rolls of 13" nominal diameter are provided in stands #13 and #15.

Referring to FIGURES 4 and 5, it can be seen that the 180° repeater 67 and the skew Y reversing table 68 are constructed to be conveniently separated when necessary. The repeaters 69, 73 and 75 are like the repeater 67, while the reversing tables 71, 74 and 76 are constructed in a manner similar to the table 68. The table 68 is firmly and permanently attached to the foundation and has one side guard 101 extending parallel to the center line of stands #1 through #9, while another side guard 102 extends parallel to the center line of stand #10. A series of rolls 103 extend across the table 68 and protrude above its surface. The axes of the rolls are at an angle inclined to the side guard 101 to hold the bar against side guard 101 as it leaves #10 stand and against side guard 102 as it enters #11 stand. A pair of electric motors 104 serves to drive the rolls through the usual transmission means, not shown. The repeater 67 is adapted to be removably fastened to the upper surface of the reversing table 68; for this purpose a number of downwardly-extending legs 105, 106 are provided on the table 67 to bear its weight and to permit fastening to the table 68 by bolts or the like. The upper surface of the repeater 67 is provided with a plurality of grooves 107 to provide for multiple-strand rolling of small stock.

The operation of the invention will now be readily understood in view of the above description with reference, as well, to the rolling schedules shown in FIGURES 6 and 7. The mill may be used to roll round stock to finished sizes in the range from #5 rod up to 2 inch bar and to roll structural shapes up to 4 inches, such as 4" x 4" angles and 4" beams. For instance, in rolling the smallest size of rod, which is #5 rod, the operator will start with 2½ inch square billet i.e., a billet that is 2½ inches on a side and has a cross-sectional area of 6.166 square inches. Referring to the rolling schedule shown in FIGURE 6, after the billet has been heated in the furnace 12, it enters stand #1 and is rolled to a horizontal oval cross-section. The billet is rolled to a more elongated oval in stand #2, the oval is edged in stand #3, a horizontal oval is produced in #4, a square on the corner in stand #5, a horizontal oval in stand #6, a square on the corner in stand #7, a horizontal oval in stand #8 and a square on the corner in stand #9. Vertical stands E1, E2 and E3 are "dummied," and the shear 65 crops the front end as the bar passes from stand #7 to stand #8. With this class of product, rolling would take place as a multi-strand process, preferably three-strand, and the individual strands pass through the pipe-type guides 66. After leaving stand #9, the bar is reversed in the 180° repeater 67 and enters stand #10 where it is rolled to a horizontal oval. At each stand, not only is the cross section changed, but the area of the section is reduced and the length of the stand increased. The bar leaves stand #10, is reversed in the repeater 69 and passes through stand #11 where it becomes a square on the corner. After passing through the guide trough 72, the bar is reversed in the 180° repeater 73 and passes through the dummied vertical stand E4 to stand #12 where it is changed to a horizontal oval and stand #13 where it is changed to a horizontal oval and stand #13 where it becomes a square on the corner. The bar is then reversed in the repeater 75 and passes through stands #14 and #15 which convert it, respectively into a horizontal oval and an edged oval. After reversal in the repeater 77, the bar passes through the finishing stands and is transformed into a horizontal oval in stand #16, a round in stand #17, a horizontal oval in stand #18, a round in stand #19, a horizontal oval in stand #20, and a finished round rod in stand #21. The rod then passes to the laying reels 22 where it is formed into coils and deposited on the reel conveyors 23 for delivery to the main conveyor 19 and the hook carrier 21. In the same way, #4 rod is rolled and finished in stand #21. For rod of ¼" and $^{17}\!/_{64}$" diameter, stands #20 and #21 are dummied and the rod is finished in stand #19; otherwise, the rolling schedule is the same apart from variations in the amount of reduction in various stands. In the case of rod $^{9}\!/_{32}$" and $^{5}\!/_{16}$" diameter, stands #18, #19, #20 and #21 are dummied and the rod is finished in stand #17; the schedules otherwise remain the same. Rod of $^{21}\!/_{64}$", $^{11}\!/_{32}$", and $^{23}\!/_{64}$" diameters use the same rolling schedule, aside from reductions, as previously described, but stands #13, #15, #18, #19, #20 and #21 are dummied. It will be recalled that stands #13 and #15 are large stands with large rolls, as compared with stands #12 and #14. For these sizes, the cross-section becomes a square on the corner in stand #14 instead of a horizontal oval. Rods which are ⅜", $^{7}\!/_{16}$" and ½" in diameter are rolled in a manner similar to those just described with the exception that stand #14 forms an edged oval instead of a square; in addition, the $^{7}\!/_{16}$" and ½" diameter rods are formed into edged ovals in stand #11, and furthermore, the ½" diameter rod is formed into an edged oval in stand #9. The above size of rods can all be coiled in the laying reels 22.

Rounds of ⅜" diameter may be precision-finished in stand #14 and either coiled in the pouring reels 18 or passed over the runout table 14 to the cooling bed 13. In this schedule, stands #13 and #15 are dummied and the precision apparatus 111 of FIGURE 3 may be used to polish the round into a perfectly circular cross-section. The rolling schedule for the stands which are used is similar to that used when the ⅜" diameter rod is finished in stand #17, except, of course, that the reduction in individual stands is greater. When $^{7}\!/_{16}$" diameter precision rounds are rolled in this manner, the shape schedule is the same, but for the production of ½" diameter precision rounds, an edged oval is formed in stand #11 instead of a square. It is interesting to note that the size range which includes ⅜", $^{7}\!/_{16}$" and ½" may be finished either on stand #17 or stand #14, there being some differences in the pass schedule, of course. This is possible because this range lies in an area where the size ranges of the two alternate outlets overlap. The same form schedule as is used in finishing ½" diameter rounds in stand #14 is used for $^{9}\!/_{16}$" and ⅝" rounds, except that edged ovals are produced in stand #9 instead of squares.

For $^{11}\!/_{64}$" diameter rounds, a 3½" square billet is used, having a cross-sectional area of 12.08 square inches. The rolling schedule for this and larger sizes is shown in FIGURE 7. It is to be noted that stands #13 and #15 are dummied and that the delivery is either to the pouring reels 18 or the cooling bed. The same procedure is used for all sizes from $^{11}\!/_{64}$" to 1¼", except that, starting with the $^{13}\!/_{14}$" round, the shape of the bar leaving stand #11 is an edged oval instead of a square. With bars which are $^{15}\!/_{16}$" or larger the cross-section leaving stand #19 is an edged oval instead of a square. In the case of products which are $1^{5}\!/_{16}$" diameter, or larger, stands #13 and #15 are used, while stands #12 and #14 are dummied. Bars of this size are reversed on the skew Y tables instead of the 180° repeaters and will be carried to the cooling bed. It is of interest to note that in the case of rounds from 1⅛" to 1½" in diameter, stands #6 and #7 are used with circularly-grooved rolls that drive the bar but do not subject it to attenuation; this is because bar in this range of sizes is not long enough at this position to reach from stand #5 to stand #8 and, therefore, if rolled from divided billets, must be driven by this expedient. On sizes of 1⅝" and larger, stands #5, #6 and #7 are dummied, but the bar is long enough to extend between stands #4 and #8 and be driven by one of these stands; on this range of sizes it is of interest to note that attentuation takes place in both stands #4 and #8, despite the fact that the cross-sectional form is a horizontal oval in both of these consecutively-operative stands.

It is a characteristic of the rolling of metal that one must use relatively small diameter rolls for sections of small cross-sectional area and large rolls for bars and structural shapes of large cross-sectional area. If excessively large rolls are used to roll a section of small cross-sectional area, there is so great an area of contact between the roll surface and the surface of the bar, in a direction lengthwise of the bar, that the energy of plastic deformation is largely spent in spreading the bar laterally, changing the form of its cross section, to the detriment of the reduction of cross-sectional area which is desired. This effect is compounded when rolls of unduly large diameter are employed in successive passes, because the increased lateral spreading in an oval pass increases the height of the oval entering the succeeding pass, where the oval is twisted into a vertical position for entry; and this would result in more lateral spreading than is desired, even with rolls of appropriate diameter. The use of unduly large rolls in the second pass accentuates the effect, to a degree which limits positively the minimum size of acceptable product which can be delivered from rolls of a given diameter. This fact is well-known to those skilled in the art, who always select the smallest possible roll diameter which will provide adequate bending and torsional strength and which will allow the front end of the bar to enter unfailingly. Selection of the proper roll diameter for the size of bar rolled is most critical in the leader and finishing stands, where the size and shape of the product are finally determined.

On the other hand, if small rolls are used to roll a large section, the rolls are too weak for the separating forces encountered and are liable to bend or break; also the front end of a large bar will not enter a pass formed by two relatively small rolls.

It should be noted that the pass schedules shown in FIGURES 6 and 7 show only the rolling of rods and rounds from #5 rod up to 2". It is easily possible also to roll squares, concrete reinforcing bar, hexagons, nut flats, and other merchant products in this mill with equal facility, these being rolled with schedules similar to those shown in FIGURE 7, the finished product emerging from either stand #14 or stand #15, depending upon the size of the product.

Another outstanding feature of the apparatus is its ability to roll structural shapes, such as angles, beams and channels, in larger sizes than have previously been possible in mills capable of producing ⅜" diameter merchant rounds. By using the large stands #13 and #15 for leader and finishing passes, it is possible to roll up to 4" angles as well as 4" beams and channels, using conventional rolling schedules for these products. Even when the rolls of these stands are provided with the deep grooves necessary for these sections, they are still strong enough to withstand without failure the large separating forces involved. This would not be possible if it were necessary to finish these sections in the smaller rolls of stand #14. In this connection, it is important to note that a 4" x 4" angle requires grooves approximately 2½" deep in each of the rolls, making the effective diameter for strength 10½" for a 13" roll and 8½" for an 11" roll. Inasmuch as strength is proportional to the cube of diameter, the 13" roll in this application is 85% stronger than a roll of 11" nominal diameter.

It is obvious that the principle of this invention can be extended to cover a wider range of size in rolled products than is set forth in this embodiment, and that the limits of the range selected for a particular application may differ materially from those specified here. It is obvious also that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

In a rolling mill having a plurality of roughing stands and a plurality of output product receiving means including a plurality of selectively usable finishing stands all operative on a common pass line, two sets of intermediate roll stands having two pairs of rolls in each set with the pairs closely spaced without intervening loops along said pass line, one pair of rolls in each set having larger diameter rolls than the other pair of rolls in the same set, means for operating one of said sets in loop forming relation to the last of said roughing stands, means for operating the other of said sets to discharge product to said receiving means, and means for operating said sets of intermediate roll stands in loop forming relation to each other, the large rolls in both sets operable interchangeably with the small rolls of both sets and selectively with both sizes of rolls in both sets operable in combination to provide three pass line operating conditions optimized for three contiguous ranges of output product size without altering said loop forming relations of said intermediate roll stands.

References Cited in the file of this patent

UNITED STATES PATENTS

| | | |
|---|---|---|
| 729,559 | Edwards | June 2, 1903 |
| 1,844,118 | George | Feb. 9, 1932 |
| 1,910,889 | Fisk | May 23, 1933 |
| 1,932,750 | Rendlemen | Oct. 31, 1933 |
| 1,987,876 | Talbot et al. | Jan. 15, 1935 |
| 2,105,258 | O'Malley | Jan. 11, 1938 |

FOREIGN PATENTS

| | | |
|---|---|---|
| 153,934 | Australia | Nov. 3, 1953 |

OTHER REFERENCES

"Unified Drives," Steel, September 6, 1943, pages 120–122, 151, 152.